Jan. 8, 1946.     A. O. WILLIAMS     2,392,562
RESILIENT WHEEL
Filed Feb. 1, 1943
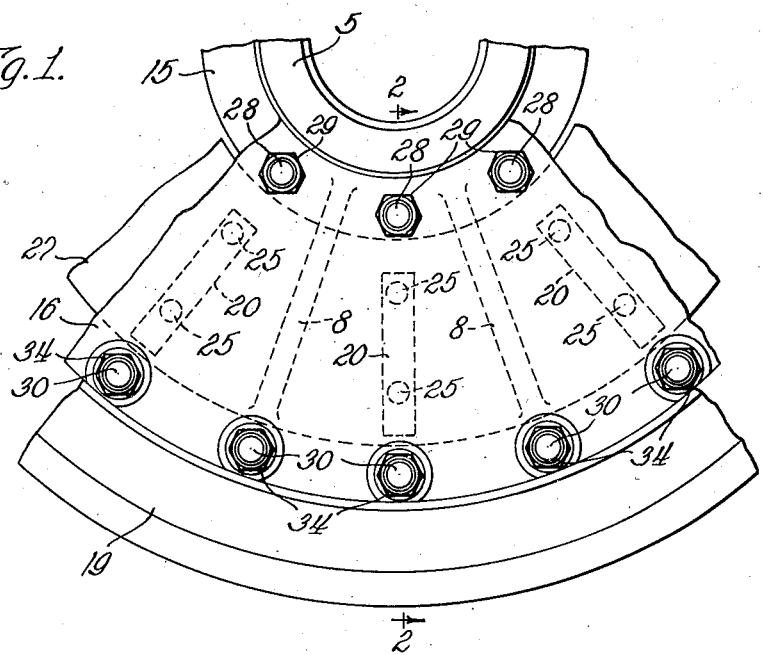
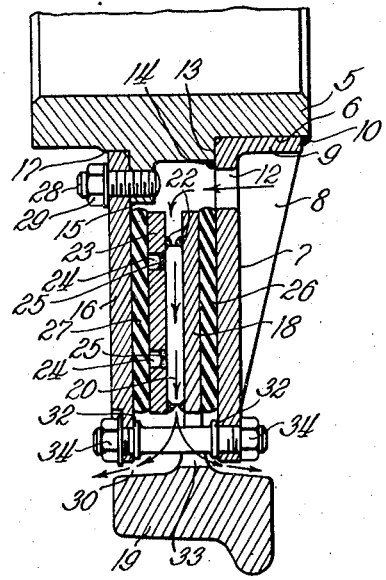
Inventor:
Alfred O. Williams
By Walter E. Schirmer
Atty.

Patented Jan. 8, 1946

2,392,562

UNITED STATES PATENT OFFICE 2,392,562

RESILIENT WHEEL

Alfred O. Williams, Battle Creek, Mich., assignor to Clark Equipment Company, Buchanan, Mich., a corporation of Michigan Application February 1, 1943, Serial No. 474,385

3 Claims. (Cl. 295—11)

This invention relates to resilient wheels of the type used in rail vehicles, such as streetcars, elevated trains and rail cars, and is concerned primarily with the construction of a wheel utilizing annular rubber discs compressed axially between radial hub and rim flanges.

More particularly, the present invention is concerned with a construction which provides for cooling of the rubber members by circulation of air past the flange pieces in such manner as to dissipate heat therefrom. The heat normally is generated by the braking action on the tread of the wheel, and may also be generated due to action to the wheel in operating over rough road beds.

One of the primary objects of the present invention is to provide a simplified wheel construction of this type, which may be easily assembled, and provides for positive circulation of air from the hub portion to the rim or tread member, and which is simple in design, facilitating assembly and maintenance.

Other objects and advantages of the present invention will appear more fully from the following detailed description which, taken in conjunction with the accompanying drawing, will disclose to those skilled in the art the particular construction and operation of the preferred form of the present invention.

In the drawing:

Figure 1 is a plan view with portions broken away of a wheel construction embodying the present invention; and Figure 2 is a sectional view taken substantially on line 2—2 of Figure 1, showing the details of the assembly.

The present wheel construction is similar to and embodies some of the same characteristics as that disclosed in my United States Patent No. 2,290,661, issued July 21, 1942, but is of simpler design and eliminates certain of the constructional features of this patent.

The wheel primarily consists of a hub portion 5, which is adapted to be pressed onto an axle shaft having an annular shoulder portion 6 adapted to receive a radially extending flange 7 having radial ribs or reinforcing members 8 and an inner cylindrical hub portion 9 seated on the annular surface 6 and secured thereto as by means of the annular ring weld 10. The flange 7 is provided intermediate each of the ribs 8 with a transverse opening 12 which forms an air port allowing introduction of air into the space within the flange 7.

The hub 5 is provided with the radial shoulder portion 14 forming an axial abutment for the flange member 7, and allowing a second weld 14' for permanently securing the flange 7 in position. Adjacent the opposite end of the hub 5 there is provided the annular radial flange 15 forming an axial abutment for a second hub flange 16, which comprises an annular disc or plate seated on the shoulder 17 of the hub and extending radially outwardly. The two flanges 16 and 7 therefore provide an annular channel-shaped opening therebetween into which extends the inwardly directed radial flange 18 of the rim or tread member 19. The flange 18 has secured thereto at circumferentially spaced intervals, the spacing bars 20 which are welded as indicated at 22 to the face of the flange 18 and to a second flange or plate member 23. This secures the flange 23 and the flange 18 rigidly together spaced apart by the spacer bars 20, which form, in effect, blades or vanes having sector shaped openings extending radially outwardly intermediate the spacer bars between the flanges 18 and 23. The flange 23 is also preferably provided with openings 24 disposed in alinement with the spacing bars 20 so as to provide for puddle welding through these openings, as indicated at 25, insuring rigid permanent attachment of the flange 23 to the spacer bars, and consequently to the rim flange 18.

In the assembly of this construction, an annular rubber disc 26 is disposed against the inner face of the flange member 7. The rim member 19 is then assembled into position with the outer face of the flange 18 bearing against the rubber disc 26. A second rubber disc 27 is then placed against the outer face of the flange 23 after which the hub flange or plate 16 is moved into position over the hub 5. The inner periphery of the plate 16 is secured to the hub 5 by means of the stud 28 and the nut 29. At the outer periphery of the flanges 7 and 16 there is provided a shouldered stud 30 having the radial shoulders 32 forming abutments to provide a predetermined spacing between the flanges 7 and 16 corresponding to the spacing between the shoulders 13 and flange 15 at the hub. This provides for uniform axial compression upon the rubber discs 26 and 27. The stud 30 is adapted to extend through suitably formed openings 33 in the rim flange 18, and the nuts 34 threaded over the ends of the stud 30 lock the flanges thereto. This provides a construction in which the rubber discs 26 and 27 are uniformly compressed between the hub and rim flanges to provide uniform shearing action in the rubber discs, accommodating relative radial movement between the hub and rim member.

By reason of the openings 12 in the flange member 7 and the sector-shaped openings disposed in the median plane of the wheel between the spacer bars 20, air may pass inwardly through the ports 12 and thence radially outwardly due to the blade action of the spacer bars, being exhausted outwardly through the openings 33 in the hub flange 18 and about the stud 30 intermediate the tread member 19 and the peripheral annular surfaces of the flanges 7 and 16. This movement of air provides for rapid dissipation of any heat built up by reason of the braking action on the wheel, and insures that the rubber discs will at all times be maintained within an operating atmosphere not sufficiently warm to provide any deteriorating action in the rubber.

It will be noted that the rubber sandwiches 26 and 27 do not have thin metallic plates bonded to the surfaces thereof. I have found that this is unnecessary and merely adds to the expense and weight of the wheel structure. The rubber will be maintained against slippage relative the surfaces of the adjacent flanges by the axial compression produced. Furthermore, there is no necessity of providing pilot or anchoring means to maintain the rubber in position. It is therefore believed that I have provided a simplified form of resilient car wheel, which is of distinct economic and operating value.

I do not intend to be limited to the exact details herein illustrated in the preferred form of the invention, but only insofar as defined by the scope and spirit of the appended claims.

I claim:

1. In a resilient wheel, a hub having a pair of laterally spaced flanges extending radially therefrom, a tread member having an integral radially inwardly directed web, circumferentially spaced radially extending bars secured to one face of said web, an annular rubber disc compressed between the opposite face of said web and the inner face of one of said flanges, a radial disc spaced from said web by said bars and secured to the outer faces of said bars in a plane parallel to said web whereby said bars define segmental radially outwardly opening air passageways between said web and disc, a second annular rubber disc compressed between other flange and said disc, and means for applying uniform compression on said rubber discs throughout their radial extent.

2. In a ventilated resilient wheel construction of the rubber sandwich type, a unit center assembly comprising a tread member having an integral inwardly extending planar flange, a series of circumferentially spaced radially extending bars welded to one face of said flange, a second planar disc member having apertures formed therein and adapted, when said disc is placed in position over the bars in spaced relation to said flange, to be in alinement with said bars, and means within said apertures securing said disc to said bars to provide a unitary assembly with said flange and disc defining therebetween a radial passageway divided into segments by said bars.

3. The construction of claim 2 wherein said disc apertures are so arranged as to provide securing means adjacent each end of each of said bars.

ALFRED O. WILLIAMS.